(12) United States Patent
Villano et al.

(10) Patent No.: US 10,754,028 B2
(45) Date of Patent: Aug. 25, 2020

(54) METHOD AND APPARATUS FOR COMPUTER-ASSISTED PROCESSING OF SAR RAW DATA

(71) Applicant: DEUTSCHES ZENTRUM FÜR LUFT-UND RAUMFAHRT E.V., Cologne (DE)

(72) Inventors: Michelangelo Villano, Gilching (DE); Gerhard Krieger, Gauting (DE); Alberto Moreira, Olching (DE)

(73) Assignee: DEUTSCHES ZENTRUM FÜR LUFT-UND RAUMFAHRT E.V., Cologne (DE)

(*) Notice: Subject to any disclaimer, the term of this patent is extended or adjusted under 35 U.S.C. 154(b) by 246 days.

(21) Appl. No.: 15/936,041

(22) Filed: Mar. 26, 2018

(65) Prior Publication Data
US 2018/0284262 A1    Oct. 4, 2018

(30) Foreign Application Priority Data
Apr. 3, 2017    (DE) .................. 10 2017 205 649

(51) Int. Cl.
*G01S 13/90*    (2006.01)
*G01S 7/295*    (2006.01)
*G01S 7/28*     (2006.01)

(52) U.S. Cl.
CPC ......... *G01S 13/9011* (2013.01); *G01S 7/2813* (2013.01); *G01S 7/295* (2013.01); *G01S 13/90* (2013.01)

(58) Field of Classification Search
CPC .... G01S 13/90; G01S 13/9011; G01S 7/2813; G01S 7/295
See application file for complete search history.

(56) References Cited

U.S. PATENT DOCUMENTS

2009/0267825 A1* 10/2009 Vetro ............... G01S 13/90
342/25 R
2012/0206292 A1*  8/2012 Boufounos ........... G01S 13/904
342/25 A
(Continued)

FOREIGN PATENT DOCUMENTS

WO    WO 97/42520 A1    11/1997

OTHER PUBLICATIONS

Sandia Report SAND2006-5332—SAR AmbiguousRange Suppression. Unlimited release. Albuquerque, New Mexiko [u.a.]: Sandia National Laboratories, Sep. 2006. 16 S.
(Continued)

*Primary Examiner* — Timothy X Pham
(74) *Attorney, Agent, or Firm* — Arent Fox, LLP

(57) ABSTRACT

The present disclosure relates to a method for computer-implemented processing of SAR raw data, which comprises radar echoes from radar pulse. An interference radar echo and an interference pulse are associated with a respective radar pulse, wherein the interference pulse and the respective radar pulse have orthogonal waveforms. SAR raw data are focused by a first focusing on the interference pulses including a range compression and an azimuth compression, to obtain first focused data, where a filtering is used for the range compression of a respective radar pulse, which filtering is matched to the waveform of the associated interference pulse. Thereafter, the first focused data undergo a signal suppression, which at least partially suppresses the interference radar echo, as a result of which second focused data are obtained. These second focused data finally undergo a defocusing including range decompression and azimuth decompression to obtain modified SAR raw data.

20 Claims, 3 Drawing Sheets

(56) References Cited

U.S. PATENT DOCUMENTS

2014/0009326 A1* 1/2014 Wishart ................ G01S 13/90
                                                    342/25 D
2018/0045825 A1* 2/2018 Yamaoka ............... G01S 13/90

OTHER PUBLICATIONS

Suppression of Range Ambiguities in Synthetic ApertureRadar Systems. In: The IEEE Region 8 EUROCON 2003: Computer as a Tool, Sep. 22-24, 2003, Ljubljana, Slovenia, S. 417-421.

Kim, Jung-Hyo et al., "Spaceborne MIMO Synthetic Aperture Radar for Multimodal Operation", IEEE Transactions on Geoscience and Remote Sensing, IEEE Service Center, Piscataway, NJ, US, vol. 53, No. 5, May 1, 2015 (May 1, 2015), pp. 2453-2466.

Riché, Vishal et al., "Optimization of OFDM SAR signals for Range ambiguity suppression", 9th European Radar Conference (EURAD), 2012, IEEE, Oct. 31, 2012 (Oct. 31, 2012), pp. 278-281.

* cited by examiner

METHOD AND APPARATUS FOR COMPUTER-ASSISTED PROCESSING OF SAR RAW DATA

CROSS REFERENCE TO RELATED APPLICATIONS

The present application for patent claims priority to German Patent Application No. 102017205649.5 entitled "METHOD AND APPARATUS FOR COMPUTER-ASSISTED PROCESSING OF SAR RAW DATA" filed Apr. 3, 2017, which is assigned to the assignees hereof, and incorporated herein by reference in its entirety.

BACKGROUND

The present disclosure relates to a method and an apparatus for computer-implemented processing of SAR raw data.

SAR systems (SAR=Synthetic Aperture Radar) enable a remote sensing of the earth's surface by detecting radar pulses reflected at the earth's surface, which are emitted by a radar device which moves at a constant speed over the earth's surface in a so-called azimuth direction. The term earth's surface is to be understood broadly and may also relate to the surface of another celestial body (preferably another planet) than the earth.

The SAR raw data detected by an SAR system contain, for a plurality of emitted radar pulses which correlate with corresponding azimuth positions, respective data samples for a plurality of so-called range positions, which represent different distances between the earth's surface and the azimuth direction and, thus, represent radar echoes from different directions. The range positions can also be specified as a so-called slant range (slant distance) or as a so-called ground range (ground distance). The slant range corresponds to the distance of the radar device from the earth's surface in the direction from which a radar echo is received. The ground range corresponds to the projection of the slant range onto the earth's surface. Both quantities can be converted into one another.

In conventional SAR systems, there is the problem that in the SAR raw data an overlap of different radar pulses can occur due to the simultaneous reception of their echoes, resulting in a deterioration in the quality of the processed SAR images. Radar echoes that are received by the radar device from the nadir, i.e. from the direction perpendicular to the earth's surface, are regarded as particularly disturbing.

In order to prevent the simultaneous reception of radar echoes in SAR systems, the pulse repetition rate of the radar pulses and the position and width of the swath of the earth's surface detected by the SAR system can be suitably matched to one another, as a result of which radar echoes from this swath are always received at different points in time. As a result, however, the swath width is limited. It is also known to emit the radar pulses as waveforms which are orthogonal to one another. Although the effect of the overlapping of simultaneously received echoes is thus reduced, there continues to be a clearly perceptible loss of quality in the SAR images.

SUMMARY

The present disclosure provides a method and an apparatus for computer-implemented processing of SAR raw data, which leads to an improved suppression of interference signals which are caused by simultaneously received radar echoes.

The method according to the present disclosure is used for computer-implemented processing of SAR raw data, which comprise radar echoes from radar pulses, which have been emitted by a radar device with one or more radar antennas on at least one flying object which is moving in an azimuth direction over the earth's surface. The radar echoes have been received and recorded by the aforementioned radar device. Consequently, the radar device comprises both one or more transmitting antennas and one or more receiving antennas, wherein a respective antenna may function both as a transmitting antenna and as a receiving antenna.

The above term "at least one flying object" is to be understood broadly and can in a variant comprise a single flying object with a radar device located thereon. The at least one flying object can also comprise two or more flying objects moving in synchrony, wherein in this case the radar device is distributed on several flying objects. For example, a transmitting antenna of the radar device can be provided only on one flying object, wherein however receiving antennas for the radar echo from different viewing angles are integrated in all flying objects.

The SAR raw data contain data samples for a plurality of range positions for each radar pulse, wherein the range positions represent different distances between the earth's surface and the azimuth direction. Depending on the embodiment, the range positions can be indicated as a slant range or as a ground range. In the SAR raw data, an interference radar echo and an interference pulse exist for a respective radar pulse. In this sense, an interference radar echo and an interference pulse are associated with a respective radar pulse. The interference radar echo is a radar echo of the interference pulse for a first range position, i.e. the radar echo of the interference pulse originates from this first range position. The interference radar echo is characterized in that it is received by the radar device simultaneously with a radar echo of the respective radar pulse for a second range position (i.e. the range position from which the radar echo of the respective radar pulse originates). The term "simultaneously received interference radar echo" is to be understood here and in the following such that the interference radar echo has a (first) range position Ro which satisfies the following condition, taking account of the resolution in the range direction (i.e. with the inaccuracy of a corresponding resolution cell):

$$R_0 = R + k\frac{c_0}{2PRF}$$

R denotes the (second) range position of the radar echo of the respective radar pulse. Furthermore, k denotes an integer value and PRF corresponds to the pulse repetition frequency with which the radar pulses are emitted. Moreover, $c_0$ corresponds to the speed of light. The above condition is stated again below especially for the nadir echo (see equation (1)). The first and second range positions are the same over all radar pulses and interference pulses in an aspect of the disclosure.

The interference pulse belongs to the radar pulses emitted by the radar device. It is however a radar pulse different from the respective radar pulse with which the interference pulse is associated. Furthermore, the interference pulse and the respective radar pulse have orthogonal waveforms. The term "orthogonal waveforms" is well known to the person skilled in the art. Orthogonal waveforms are characterized in that their scalar product is equal to zero. This orthogonality can be ensured by suitable variation of the waveforms of emitted radar pulses.

In a step a) of the method according to the present disclosure, the SAR raw data are focused by a first focusing on the interference pulses associated with the respective radar pulses, as a result of which first focused data are obtained. A range compression and an azimuth compression are carried out as part of the first focusing. The methods of range compression and azimuth compensation are known per se and are explained in greater detail in the detailed description. The range compression is implemented by the application of a filter or a filtering to the raw data of each radar pulse. Conventionally, this filtering is matched to the waveform of the respective radar pulse. According to the present disclosure, the filtering is now changed in step a) such that it is no longer matched to the waveform of the respective radar pulse, but rather to the waveform of the interference pulse associated with the respective radar pulse. In particular, the filtering is implemented by a (temporal) convolution of the raw data of the respective radar pulse with a function, which function corresponds to the time-inverted and complex-conjugated waveform of the associated interference pulse. The convolution is preferably determined by a multiplication in the frequency domain of the signals. By means of step a) of the method according to the present disclosure, first focused data are thus obtained, which are focused on the interference radar echo.

In a step b) of the method according to the p, the first focused data undergo a signal suppression, which at least partially suppresses the focused and therefore locally limited interference radar echo, as a result of which second focused data are obtained. In a manner known per se, the second focused data undergo a defocusing in a next step c), as a result of which modified SAR raw data are obtained. The defocusing includes a range decompression and an azimuth decompression, which are inverse to the above range and azimuth compression of the first focusing. The corresponding methods for range decompression and azimuth decompression are known per se. A filtering is used as part of the range decompression, which filtering is inverse to the above filtering of the range compression. In particular, a convolution of the signal of the respective radar pulse is carried out in this filtering, which in the frequency domain corresponds to a multiplication of the signal by the inverse of the complex conjugate of the waveform of the associated interference pulse.

In an aspect, the method according to the present disclosure is characterized in that the SAR raw data are modified in such a way that interference radar pulses which are simultaneously received with other radar pulses are suppressed in the raw data. Use is made here of the finding that an interference pulse can be focused in the data like any other radar pulse and that this focused pulse can then be suitably suppressed. Due to the orthogonal waveforms of the interference pulse and the associated radar pulse, the image information of the useful signal remains intact apart from a minimal and therefore negligible degradation.

In a variant of the method according to the present disclosure, the modified raw data are focused on the respective radar pulses by a second focusing, as result of which third focused data are obtained, which then correspond to an SAR radar image. As part of the second focusing, a range compression known per se and an azimuth compression known per se are carried out, wherein, for the range compression of a respective radar pulse, a filtering is now used which is matched to the waveform of the respective radar pulse. In particular, the raw data of the respective radar pulses are convolved (temporally) with its time-inverted and complex-conjugated waveform. The embodiment just described is preferably always used when only one interference pulse is to be suppressed for each radar echo.

In a further variant of the present disclosure, apart from the above interference pulse, further interference pulses are associated with a respective radar pulse, the interference pulse referring to a first and/or second range position which is different compared to the above interference pulse. In this case, steps a) to c) can be repeated iteratively for the respective further interference pulses, wherein at the start of each repetition the SAR raw data are equated with the modified SAR raw data last obtained. After completion of the repetitions, the second focusing described above is preferably applied to the obtained modified raw data, as a result of which a focused SAR image is in turn generated.

In another embodiment, the interference radar echo suppressed in the method according to the present disclosure is a nadir echo, the first range position thereof corresponds to the shortest distance between the earth's surface and the azimuth direction. In other words, this echo is received by the radar device from the direction perpendicular to the earth's surface and thus originates from the nadir. Normally, SAR raw data contain only a single nadir echo for a respective radar pulse. The nadir echo is considered as particularly disturbing in SAR images and appears as a bright stripe in the focused image.

In another embodiment, the radar pulses are frequency-modulated and preferably linear frequency-modulated waveforms. These waveforms are usually referred to as chirps.

In another variant, all the radar pulses have the same pulse duration, wherein the waveform of an emitted radar pulse corresponds to the waveform of the previously emitted radar pulse shifted cyclically within the pulse duration. A cyclic shift is to be understood such that the radar pulse is shifted along with the time axis, wherein the part of the radar pulse that moves out of the time window of the pulse duration is pushed in at the other end of the time window. Radar pulses with orthogonal waveforms can easily be obtained by means of such a cyclic shift.

In a further embodiment, the orthogonal waveforms of the radar pulses are obtained by emitting the radar pulses in repeating sequences of successive radar pulses, wherein waveforms $s_i(t)$ of the radar pulses within a sequence read as follows:

$$s_i(t) = \begin{cases} e^{j\pi \frac{B}{T}\left(t-t_i-T\left(\left\lfloor\frac{t+\frac{T}{2}-t_i}{T}\right\rfloor\right)\right)^2}, & -\frac{T}{2} \leq t \leq \frac{T}{2} \\ 0, & \text{otherwise} \end{cases}$$

wherein i indicates the radar pulses of the successive sequence and i=0, ..., 2BT−1 holds, wherein B represents the bandwidth of the radar pulse and T represents the pulse duration;
wherein $$t_i = \frac{i(i+1)}{2B} - T\left\lfloor\frac{i(i+1)+BT}{2BT}\right\rfloor$$

holds.

The expression $\lfloor \cdot \rfloor$ represents the largest integer which is less than or equal to the argument of the expression.

The signal suppression carried out in the method according to the present disclosure can be implemented in different ways. In a variant, the signal suppression is such that the second range position is determined for a respective radar pulse and the signal is at least partially suppressed in the first focused data essentially only at the second range position. This variant is preferably used for the suppression of the nadir echo, since the position of the radar echo which is disturbed by the nadir echo can easily be determined (see equation (1) in the detailed description).

In a further variant of the method according to the present disclosure, the signal suppression is such that a threshold value is applied to the signals in the entire first focused data, so that all signals above the threshold value are cut off at the threshold value or alternatively the signals are set to zero only at the positions which exceed the threshold value and otherwise remain unchanged. In this case, corresponding range positions of radar pulses that are disturbed by simultaneously received interference radar echoes no longer have to be determined.

Apart from the method described above, the present disclosure relates to an apparatus for computer-implemented processing of SAR raw data, which comprise radar echoes of radar pulses which have been emitted by a radar device on at least one flying object, which is moving in an azimuth direction over the earth's surface. The radar echoes of the radar pulses have been received and recorded by the radar device, wherein the SAR raw data contain data samples for a plurality of range positions for each radar pulse and the range positions represent different distances between the earth's surface and the azimuth direction. In the SAR raw data, an interference radar echo and an interference pulse exist for a respective radar pulse, wherein the interference radar echo is a radar echo of the interference pulse for a first range position and the interference radar echo is received by the radar device simultaneously with a radar echo of the respective radar pulse for a second range position. The interference pulse is another radar pulse other than the respective radar pulse. Furthermore, the interference pulse and the respective radar pulse have orthogonal waveforms.

The apparatus according to the present disclosure is configured such that it is arranged to perform steps a) to c) of the method according to the present disclosure. In other words, the apparatus comprises a suitable signal processing unit in order to perform steps a) to c).

In an embodiment, the apparatus according to the present disclosure is configured to perform one or more preferred variants of the method according to the present disclosure.

The present disclosure relates, moreover, to a computer program product with a program code stored on a machine-readable carrier for performing the method according to the present disclosure or one or more preferred variants of the method according to the present disclosure, when the program code is executed on a computer.

Moreover, the present disclosure includes a computer program with a program code for performing the method according to the present disclosure or one or more variants of the method according to the present disclosure, when the program code is executed on a computer.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

Figure 1:
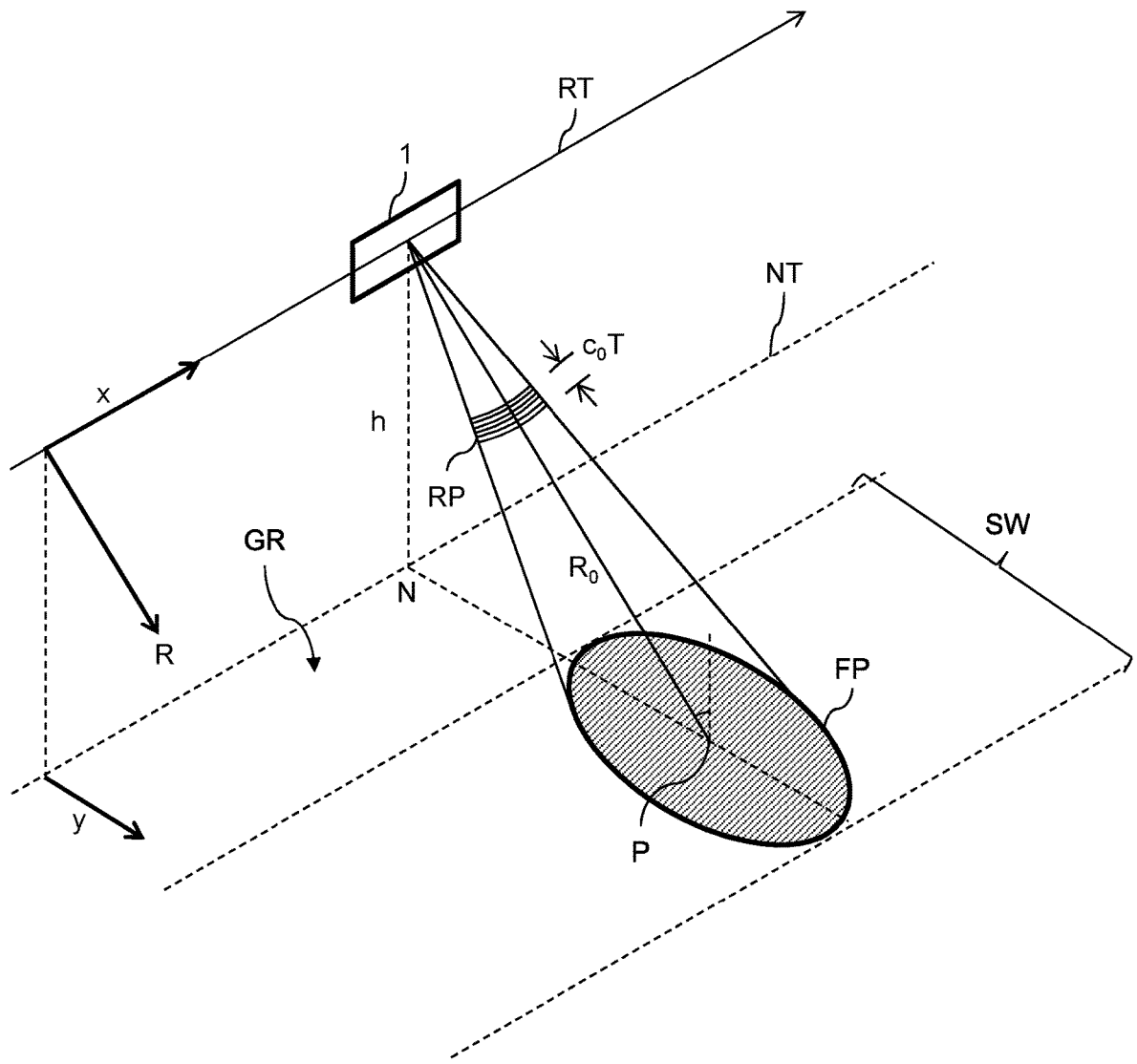
FIG. 1 shows a diagrammatic representation, based on which the SAR principle used within the scope of the present disclosure is explained.

FIG. 1 shows in a diagrammatic representation a SAR radar device 1, which is indicated as a rectangular aperture and, depending on the embodiment, comprises one or more antennas. In the represented scenario, the radar device is located on a satellite (not shown), which is moving at a height h along a radar path RT above the earth's surface GR. The direction of the radar path corresponds to the azimuth direction known per se, which is denoted by reference symbol x in FIG. 1. Instead of moving the radar device by means of a satellite, another flying object may be used for this purpose, e.g. an aircraft.

The radar device 1 emits radar pulses RP in successive pulse repetition intervals at a predetermined pulse repetition frequency in an oblique direction to the earth's surface GR. The major part of the energy of a respective radar pulse is directed onto the elliptical area FP on the earth's surface. This area is usually referred to as a "footprint" of the radar device or of the associated radar antenna.

According to FIG. 1, a respective radar pulse RP has a predetermined pulse duration T, so that the radar pulse has the spatial extension $c_0 T$, wherein $c_0$ corresponds to the speed of light. As part of an SAR measurement, radar echoes of radar pulses RP scattered back from the Earth's surface are received and recorded by radar device 1 during its movement along path RT. Information about the earth's surface in the swath SW is thus detected. The radar device is configured such that it is arranged for both transmitting radar pulses and receiving corresponding radar echoes. The radio echoes detected by the radar device depend on the form and character of the earth's surface and enable, with a known subsequent signal processing, the calculation of SAR images of the earth's surface.

Before performing the subsequent signal processing, the detected radar echoes are represented, after an analog-digital conversion, by so-called SAR raw data. These raw data are data samples which contain the amplitude and the phase of the sampled radio echoes. The raw data are arranged in a two-dimensional matrix, wherein one dimension of the matrix corresponds to the respective emitted radar pulse (represented by a pulse number) and the other dimension of the matrix represents a time delay, which represents the time period which a sampled radar echo requires to propagate from the radar device to the earth's surface and back to radar device 1. In other words, the so-called slant range R is represented by this time period, said slant range corresponding to the distance between the radar device and the scattering point of the radar echo on the earth's surface. The distance can thus be equated with a direction from which the sampled radar echo passes from the earth's surface GR to radar device 1.

In the scenario of FIG. 1, the reflection of a radar echo at scattering point P on the earth's surface is indicated by way of example. The slant range of this radar echo is denoted by Ro. The slant range is in a geometrical relationship with the so-called ground range (ground distance), which is denoted in FIG. 1 by y and represents the distance between nadir path NT and the corresponding scattering point. The value of a slant range R can thus be unambiguously converted into the value of a corresponding ground range y. Nadir path NT is the vertical projection of radar path RT onto the earth's surface GR. Position N on path NT is the so-called nadir, i.e. the point on the earth's surface with the shortest distance to the radar device. A radar echo from nadir N is referred to as a nadir echo.

As already mentioned, the SAR raw data undergo a subsequent signal processing. Depending on the embodiment, this signal processing can already take place in the satellite, wherein the processed information is then transmitted to a ground station on the earth's surface. Alternatively, the SAR raw data may be transmitted to a ground station without post-processing, the post-processing being carried out in the ground station so as to obtain SAR images from the raw data. The post-processing comprises two filter operations, which are carried out along the range direction R or y and along the azimuth direction x. The filter operation along the range direction is often referred to as a range compression and the filter operation along the azimuth direction is referred to as an azimuth compression. With these operations, a focusing of the SAR raw data is achieved, in order to calculate SAR images.

As part of the range compression, a signal-matched filter is used for the data samples in the range direction of the radar echoes of each radar pulse. In this filter, the data samples along the range direction and therefore along the time axis are convolved with function h(t), which results from the complex-conjugated and time-inverted waveform s(t) of the corresponding radar pulse, i.e. the following holds:

$$h(t) = s^*(-t)$$

By means of this range compression, the SNR ratio (SNR=Signal to Noise Ratio) of the signal is maximized and the scattering point is located at the correct range position.

Besides the range compression, the aforementioned azimuth compression is carried out. Like the range compression, the azimuth compression is known per se and thus will not be explained in detail. The azimuth compression is based on the finding that scattering points on the earth's surface with different azimuth angles relative to radar path RT comprise frequency shifts in the radar echoes on account of the Doppler effect. By analyzing of the Doppler frequency spectrum, a scattering point on the earth's surface can be located in the azimuth direction. The azimuth compression thus leads to a sharpening of the data in the azimuth direction.

The SAR data acquisition has the problem that a significant radar echo is also received from nadir N outside the swath SW. Hence, a radar echo for a specific range position is usually superimposed by the nadir echo of a subsequently transmitted radar pulse, since the nadir echo, due to the shorter travel path, is detected by the radar device at the same point in time as the considered radar echo. A nadir echo occurs for the range position Ro shown in FIG. 1 when the following condition is met:

$$R_0 = h + k \frac{c_0}{2PRF} \quad (1)$$

k denotes an integer value and PRF corresponds to the pulse repetition frequency with which the radar pulses are emitted. h is the height (already mentioned) of the radar device above the earth's surface GR and $c_0$ corresponds to the speed of light.

Although radar device 1 is intended to concentrate the energy in the swath SW, the nadir echo cannot be prevented due to the special properties of the scattering process (specular reflection). Under certain circumstances, the nadir echo may be stronger than the radar echo on which it is superimposed. The nadir echo can thus significantly degrade the quality of a focused SAR image. The nadir echo appears in the SAR image as a bright stripe at the position on the earth's surface which corresponds to the range position of the radar echo which is disturbed by the nadir echo.

Conventionally, nadir echoes are avoided in SAR images by matching the pulse repetition frequency and the position or width of the detected swath on the earth's surface to one another, so that the nadir echoes do not occur inside the swath. As a result, however, the width of the swath is limited and furthermore the performance of the SAR system with regard to ambiguities is degraded. In order to improve the performance, it may be necessary to increase the complexity of the system, e.g. by increasing the size of the radar antennas.

Figure 2:
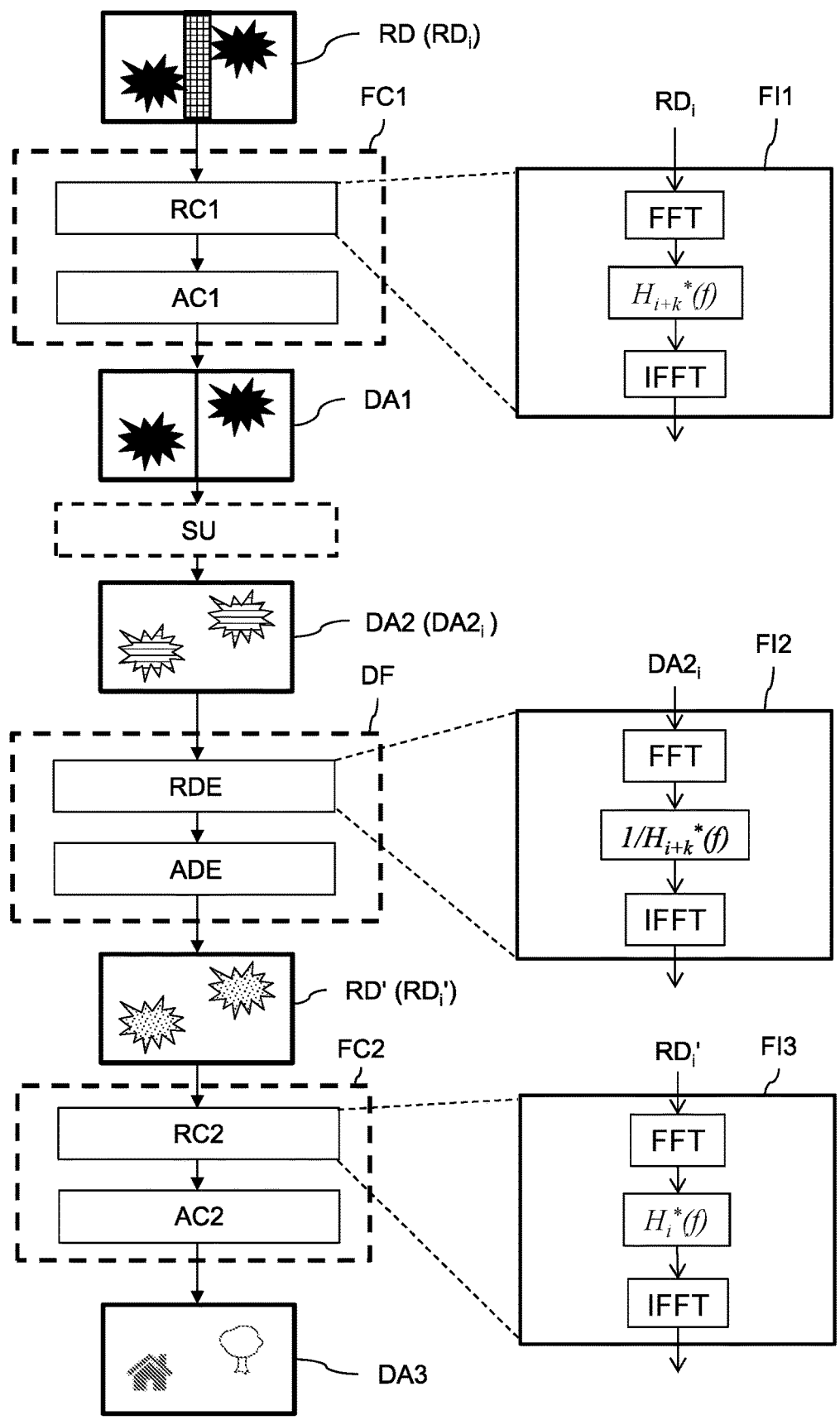
FIG. 2 shows a flow chart, which illustrates the steps of a variant of the method according to the present disclosure.

Within the scope of the present disclosure, a new approach is used in the signal processing of SAR raw data, in order reliably to remove the nadir echo from these data. This new approach is explained below based on FIG. 2. The starting point of the method of FIG. 2 is the originally detected SAR raw data, which are denoted by RD. As already mentioned above, the SAR raw data contain, for each radar pulse, data samples for a plurality of range positions. The raw data for a respective radar pulse are denoted in FIG. 2 by $RD_i$, wherein i indicates the corresponding radar pulse. As an example, the raw data are represented by an image which contains two objects in the form of a house and a tree, wherein both objects are blurred in the SAR raw data, as indicated by blotches represented dotted. The raw data also contain a nadir echo, which is indicated by a broad vertical stripe at the range position from which the radar echo is received on which the nadir echo is superimposed. This stripe is indicated in FIG. 1 by a square pattern.

To implement the method according to the present disclosure, it has been ensured during the acquisition of the SAR raw data that radar pulses are emitted in repeating sequences of waveforms orthogonal to one another, i.e. each pair of waveforms within a sequence has a scalar product of zero. In the embodiment described here, the waveforms within a sequence are cyclically shifted chirps, wherein a chirp is a linearly frequency-modulated waveform with a predetermined pulse duration. A corresponding chirp $s_i(t)$ is given by the following equation:

$$s_i(t) = \begin{cases} e^{j\pi \frac{B}{T}\left(t - t_i - T\left(\left\lfloor \frac{t + \frac{T}{2} - t_i}{T} \right\rfloor\right)\right)^2}, & -\frac{T}{2} \le t \le \frac{T}{2} \\ 0, & \text{otherwise} \end{cases} \quad (2)$$

T denotes the pulse duration of the chirp, B is the waveform bandwidth (i.e. the bandwidth of the frequencies contained therein) and i represents the i-th pulse within a sequence. The quantity $t_i$ specifies the magnitude of the cyclic shift, wherein $t_i$ is defined as follows:

$$t_i = \frac{i(i+1)}{2B} - T\left\lfloor \frac{i(i+1)+BT}{2BT} \right\rfloor, i = 0, \ldots, 2BT-1 \quad (3)$$

A sequence thus contains 2BT pulses, which differ from one another by cyclic shifts. A cyclic shift means that the pulse is shifted in the direction of the time axis and the portion of the pulse which exceeds the limit of the pulse duration at T/2 is added at the front end of the pulse duration at −T/2.

Figure 3:
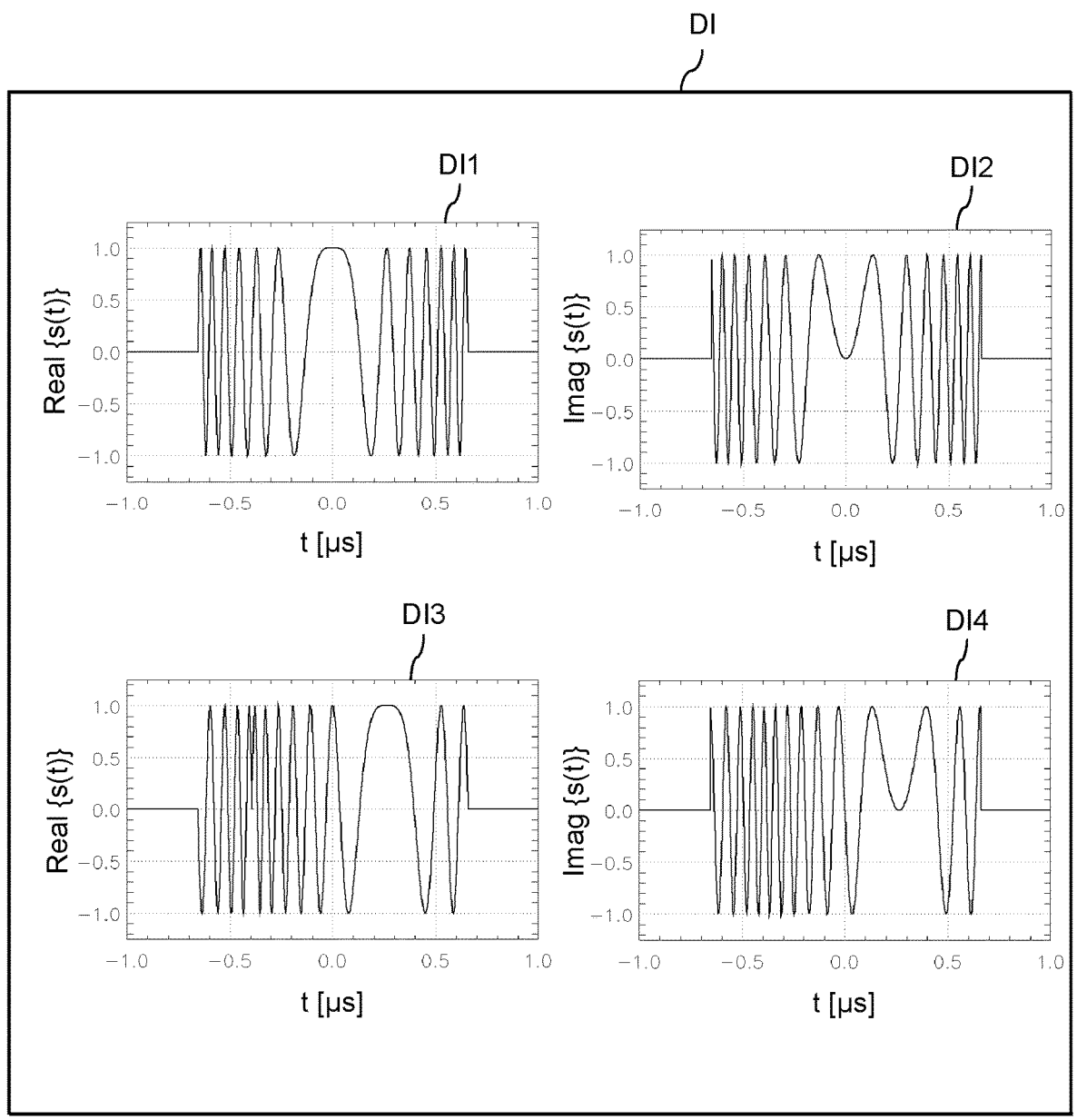
FIG. 3 shows a diagram which shows the waveforms of radar pulses which are used in an embodiment of the present disclosure.

The cyclic shift of the pulses just described for achieving orthogonal waveforms is indicated in diagram DI of FIG. 3. Sub-diagram DI1 shows the real part of above pulse $s_0(T)$, whereas diagram DI2 illustrates the imaginary part of this pulse. In contrast, diagram DI3 shows the real part of the pulse for an index i, which corresponds to a shift of 0.3 μs, whereas diagram DI4 illustrates the corresponding imaginary part. It can clearly be seen from diagrams DI1 to DI4 that both the real parts and the imaginary parts of the pulse waveforms are shifted within the pulse duration along the time axis. By using the above orthogonal waveforms, it is ensured that the nadir echo in the processing of FIG. 2 has a waveform which is orthogonal to the waveform of the pulse which arrives simultaneously with the nadir echo.

In the signal processing of FIG. 2, a first focusing FC1 of the SAR raw data is first carried out. As part of this first focusing, a first range compression RC1 is carried out for the respective pulses. The range-compressed data are further compressed by a first azimuth compression AC1 in the azimuth direction. Range compression RC1 and azimuth compression AC1 and analogously also compressions RC2 and AC2 as well as corresponding decompressions RDE and ADE are represented in FIG. 2 as separate steps for the sake of greater clarity. These compressions and correspondingly also the decompressions are usually nested into one another, in order to correct further effects such as the "range cell migration" known per se.

As part of the first range compression RC1, corresponding SAR raw data $RD_i$ of each radar pulse undergo a first filtering FI1. In such a filtering, a temporal convolution is carried out, which is calculated in the frequency domain in the embodiment described here. To do so, the raw data $RD_i$ first undergo an FFT transformation (FFT=Fast Fourier Transformation) and the signal thus contained is then multiplied by the Fourier transformation of a pulse response. In contrast with a conventional range compression, this pulse response is based not on the i-th pulse just processed, but on the radar pulse that belongs to the nadir echo. In the shown scenario, this radar pulse has index (i+k), i.e. it is the k-th radar pulse after the i-th radar pulse.

Accordingly, a multiplication by function $H_{i+k}^*(f)$ takes place during filtering FI1, which function is the Fourier transform of function $h_{i+k} = s_{i+k}^*(-t)$, wherein $s_{i+k}(t)$ corresponds to the cyclically shifted chirp of the (i+k)-th radar pulse. An IFFT transformation (IFFT=Inverse Fast Fourier Transformation) is then carried out. After filtering all radar pulses, the first azimuth compression AC1 follows, which does not differ from a conventional azimuth compression according to the prior art. Thus, this compression is not described in detail. A particular feature, however, is that this azimuth compression is not matched to the image distance of the useful signal, but rather to the distance of the nadir pulse. First data DA1 are finally obtained in the form of an SAR image, in which the nadir echo is focused without the useful signal being lost. In other words, the data DA1 now contain a nadir echo in the form of a narrow vertical line, whereas the useful data remain almost completely intact in the form of blotches in the image. The useful data are in addition blurred, which is indicated by different hatching of the blotches compared to raw data RD.

The data DA1 then undergo a signal suppression SU. Since the position of the radar echo disturbed by the nadir echo is known from the geometry of the SAR measurement (see equation (1)), the signal is suppressed in a dedicated manner only at the location of the disturbed radar pulse in data DA1 in the embodiment described here. Consequently, the data DA2 are obtained in the form of an SAR image, in which the nadir echo is removed. The samples of the data DA2 for a radar pulse with index i are denoted by $DA2_i$.

The data DA2 then undergo a defocusing DF known per se, which comprises a range decompression RDE and an azimuth decompression ADE. As part of the range decompression, an inverse filtering FI2 is carried out. This takes place again in the frequency domain. Hence, an FFT transformation of the samples $DA2_i$ is first carried out, followed by a multiplication by the reciprocal of above function $H_{i+k}(f)$ as well as by a subsequent IFFT transformation. Besides the range decompression RDE, the azimuth decompression ADE is applied to the data in a manner known per se. Since this azimuth decompression takes place with methods known per se, it is not described in detail here.

After the defocusing DF, modified raw data RD' are obtained, which apart from a minimal degradation correspond to original raw data RD and from which the nadir echo is removed. These modified raw data RD' then undergo a second focusing FC2, in which however a filtering FI3 is now used as part of range compression RC2, which filtering is matched to the respective radar pulses. As part of this filtering, the modified raw data $RD_i'$ of a respective radar pulse again undergo an FFT transformation, wherein a multiplication by function $H_i^*(f)$ then takes place, which is the Fourier transform of function $h_i(t)=s_i^*(-t)$, wherein $s_i(t)$ corresponds to the chirp of the i-th radar pulse. Finally, the signal is again transformed with an IFFT transformation into the time space. Apart from second range compression RC2, a second azimuth compression AC2 is carried out in a manner known per se.

As a result of the second focusing FC2, third data DA3 are finally obtained, which correspond to a focused SAR image, which no longer contains the nadir echo. As can be seen from FIG. 2, both objects in the form of a house and a tree can now be seen in the image, without the image containing a disturbing stripe that is caused by the nadir echo.

The embodiment of the present disclosure as described above has a number of advantages. In particular, as part of the processing of SAR raw data, a first focusing on the nadir echo is carried out, whereby the filtering is matched to the waveform of the pulse whose radar echo corresponds to the nadir echo. In this way, the nadir echo is focused and can be removed in the data thus obtained by a suitable signal suppression. By means of a subsequent defocusing, modified raw data are obtained without a nadir echo, which raw data can then be converted with a second focusing, now matched to the useful signal, into the SAR image, which then no longer contains a nadir echo. It is therefore no longer necessary to observe any limitations with regard to the pulse repetition frequency of the radar pulses and the nadir echo can essentially be completely removed. By using orthogonal waveforms, it is at the same time ensured that the information from the useful data remains intact with a negligibly small degradation.

The above embodiment of the present disclosure has been explained based on a suppression of a nadir echo. Nonetheless, the present disclosure can also be used to remove so-called range ambiguities from the SAR raw data. Range ambiguities occur when radar echoes are received from different range positions within the swath detected from the earth's surface. For a range position, a range ambiguity can occur at one or also at a plurality of different range positions. In order to suppress such range ambiguities for a predetermined range position (with associated i-th radar pulse), the steps of FIG. 2 up to the acquisition of the modified radar echo RD' are carried out iteratively for each range ambiguity, which is then represented by an interference pulse with the index (i+k) (wherein k may possibly also be negative). The raw data RD are equated with the modified raw data RD' when processing of a new range ambiguity. The above steps can also be repeated iteratively for a plurality of range positions, at which respective ambiguities exist at other range positions. In contrast with the signal suppression for the nadir echo described above, the suppression of range ambiguities is based on a threshold value, wherein all signals which lie above the threshold value within data DA1 are cut off at the threshold value. Alternatively, the signals are set to zero only at the positions which exceed the threshold value.

Although the operations or methods described above are presented in a particular order and/or as being performed by an example component, it should be understood that the ordering of the actions and the components performing the actions may be varied, depending on the implementation. In addition, aspects of any one of the methods described above can be combined with aspects of any other of the methods.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

The invention claimed is:

1. A method for computer-implemented processing of Synthetic Aperture Radar (SAR) raw data, which comprise radar echoes from radar pulses, which have been emitted by a radar device on at least one flying object which is moving in an azimuth direction over the earth's surface, wherein the radar echoes of the radar pulses have been received and recorded by the radar device and wherein the SAR raw data contain data samples for a plurality of range positions for each radar pulse, wherein the range positions represent different distances between the earth's surface and the azimuth direction, wherein an interference radar echo and an interference pulse are associated with a respective radar pulse, wherein the interference radar echo is a radar echo of the interference pulse for a first range position and the interference radar echo is received by the radar device simultaneously with a radar echo of the respective radar pulse for a second range position, wherein the interference pulse is a radar pulse other than the respective radar pulse and wherein the interference pulse and the respective radar pulse have orthogonal waveforms, wherein
a) the SAR raw data are focused by a first focusing on the interference pulses associated with the respective radar pulses, as a result of which first focused data are obtained, wherein a range compression and an azimuth compression are carried out as part of the first focusing where a filtering is used for the range compression of a respective radar pulse, which filtering is matched to the waveform of the associated interference pulse,
b) the first focused data undergo a signal suppression, which at least partially suppresses the associated interference radar echo for each radar pulse, as a result of which second focused data are obtained;
c) the second focused data undergo defocusing, as a result of which modified SAR raw data are obtained, wherein as part of the defocusing a range decompression and an azimuth decompression are carried out, which are inverse to the range compression and the azimuth compression of the first focusing.

2. The method according to claim 1, wherein the modified raw data are focused on the respective radar pulses by a second focusing, as a result of which third focused data are obtained, wherein a range compression and an azimuth compression are carried out as part of the second focusing, where a filtering is used for the range compression of a respective radar pulse, which filtering is matched to the waveform of the respective radar pulse.

3. The method according to claim 1, wherein the interference radar echo of the interference pulse is a nadir echo, the first range position thereof corresponds to the shortest distance between the earth's surface and the azimuth direction.

4. The method according to claim 1, wherein the radar pulses are frequency-modulated and preferably linearly frequency-modulated waveforms.

5. The method according to claim 1, wherein all radar pulses have the same pulse duration and the waveform of an emitted radar pulse corresponds to the waveform of the previously emitted radar pulse shifted cyclically within the pulse duration.

6. The method according to claim 1, wherein the radar pulses are emitted in repeating sequences of successive radar pulses wherein waveforms $s_i(t)$ of the radar pulses within a sequence read as follows:

$$s_i(t) = \begin{cases} e^{j\pi \frac{B}{T}\left(t-t_i-T\left(\left\lfloor \frac{t+\frac{T}{2}-t_i}{T}\right\rfloor\right)\right)^2}, & -\frac{T}{2} \leq t \leq \frac{T}{2} \\ 0, & \text{otherwise} \end{cases}$$

wherein i indicates the successive radar pulses of the sequence and i=0, 2BT−1 holds, wherein B represents the bandwidth of the radar pulse and T represents the pulse duration;

$$t_i = \frac{i(i+1)}{2B} - T\left\lfloor \frac{i(i+1)+BT}{2BT} \right\rfloor$$

wherein holds.

7. The method according to claim 1, wherein the signal suppression is such that the second range position is determined for a respective radar pulse and the signal is at least partially suppressed in the first focused data essentially only at the second range position.

8. The method according to claim 1, wherein the signal suppression is such that a threshold value is applied to the signals in the entire first focused data, so that all signals above the threshold value are cut off at the threshold value or so that the signals are set to zero only at the positions which exceed the threshold value.

9. An apparatus for the computer-implemented processing of Synthetic Aperture Radar (SAR) raw data, which comprise radar echoes of radar pulses which have been emitted by a radar device on at least one flying object, which is moving in an azimuth direction over the earth's surface, wherein the radar echoes of the radar pulses have been received and recorded by the radar device and wherein the SAR raw data contain data samples for a plurality of range positions for each radar pulse, wherein the range positions represent different distances between the earth's surface and the azimuth direction, wherein an interference radar echo and an interference pulse are associated with a respective radar pulse, wherein the interference radar echo is a radar echo of the interference pulse for a first range position and the interference radar echo is received by the radar device simultaneously with a radar echo of the respective radar pulse for a second range position, wherein the interference pulse is a radar pulse other than the respective radar pulse and wherein the interference pulse and the respective radar pulse have orthogonal waveforms, wherein the apparatus is configured to perform a method, wherein
a) the SAR raw data are focused by a first focusing on the interference pulses associated with the respective radar pulses, as a result of which first focused data are obtained, wherein a range compression and an azimuth compression are carried out as part of the first focusing, where a filtering is used for the range compression (RC1) of a respective radar pulse, which filtering is matched to the waveform of the associated interference pulse,
b) the first focused data undergo a signal suppression which at least partially suppresses the associated interference radar echo for each radar pulse, as a result of which second focused data are obtained;
c) the second focused data undergo defocusing, as a result of which modified SAR raw data are obtained, wherein as part of the defocusing a range decompression and an azimuth decompression are carried out, which are inverse to the range compression and the azimuth compression of the first focusing.

10. The apparatus according to claim 9, wherein the modified raw data are focused on the respective radar pulses by a second focusing, as a result of which third focused data are obtained, wherein a range compression and an azimuth compression are carried out as part of the second focusing, where a filtering is used for the range compression of a respective radar pulse, which filtering is matched to the waveform of the respective radar pulse.

11. The apparatus according to claim 9, wherein the interference radar echo of the interference pulse is a nadir echo, the first range position thereof corresponds to the shortest distance between the earth's surface and the azimuth direction.

12. The apparatus according to claim 9, wherein at least one of:
the radar pulses are frequency-modulated or linearly frequency-modulated waveforms; or
all radar pulses have the same pulse duration and the waveform of an emitted radar pulse corresponds to the waveform of the previously emitted radar pulse shifted cyclically within the pulse duration.

13. The apparatus according to claim 9, wherein the radar pulses are emitted in repeating sequences of successive radar pulses, wherein waveforms $s_i(t)$ of the radar pulses within a sequence read as follows:

$$s_i(t) = \begin{cases} e^{j\pi \frac{B}{T}\left(t-t_i-T\left(\left|\frac{t+\frac{T}{2}-t_i}{T}\right|\right)\right)^2}, & -\frac{T}{2} \le t \le \frac{T}{2} \\ 0, & \text{otherwise} \end{cases}$$

wherein i indicates the successive radar pulses of the sequence and i=0, 2BT−1 holds, wherein B represents the bandwidth of the radar pulse and T represents the pulse duration;

$$t_i = \frac{i(i+1)}{2B} - T\left\lfloor \frac{i(i+1)+BT}{2BT} \right\rfloor$$

wherein holds.

14. The apparatus according to claim 9, wherein the signal suppression is such that at least one of:
the second range position is determined for a respective radar pulse and the signal is at least partially suppressed in the first focused data essentially only at the second range position; or
a threshold value is applied to the signals in the entire first focused data, so that all signals above the threshold value are cut off at the threshold value or so that the signals are set to zero only at the positions which exceed the threshold value.

15. A non-transitory computer-readable medium storing computer code executable by a processor, comprising one or more codes executable to process Synthetic Aperture Radar (SAR) raw data, which comprise radar echoes from radar pulses, which have been emitted by a radar device on at least one flying object which is moving in an azimuth direction over the earth's surface, wherein the radar echoes of the radar pulses have been received and recorded by the radar device and wherein the SAR raw data contain data samples for a plurality of range positions for each radar pulse, wherein the range positions represent different distances between the earth's surface and the azimuth direction, wherein an interference radar echo and an interference pulse are associated with a respective radar pulse, wherein the interference radar echo is a radar echo of the interference pulse for a first range position and the interference radar echo is received by the radar device simultaneously with a radar echo of the respective radar pulse for a second range position, wherein the interference pulse is a radar pulse other than the respective radar pulse and wherein the interference pulse and the respective radar pulse have orthogonal waveforms, wherein
a) the SAR raw data are focused by a first focusing on the interference pulses associated with the respective radar pulses, as a result of which first focused data are obtained, wherein a range compression and an azimuth compression are carried out as part of the first focusing, where a filtering is used for the range compression of a respective radar pulse, which filtering is matched to the waveform of the associated interference pulse,
b) the first focused data undergo a signal suppression, which at least partially suppresses the associated interference radar echo for each radar pulse, as a result of which second focused data are obtained;
c) the second focused data undergo defocusing, as a result of which modified SAR raw data are obtained, wherein as part of the defocusing a range decompression and an azimuth decompression are carried out, which are inverse to the range compression and the azimuth compression of the first focusing.

16. The non-transitory computer-readable medium according to claim 15, wherein the modified raw data are focused on the respective radar pulses by a second focusing, as a result of which third focused data are obtained, wherein a range compression and an azimuth compression are carried out as part of the second focusing where a filtering is used for the range compression of a respective radar pulse, which filtering is matched to the waveform of the respective radar pulse.

17. The non-transitory computer-readable medium according to claim 15, wherein the interference radar echo of the interference pulse is a nadir echo, the first range position thereof corresponds to the shortest distance between the earth's surface and the azimuth direction.

18. The non-transitory computer-readable medium according to claim 15, wherein at least one of:
the radar pulses are frequency-modulated or linearly frequency-modulated waveforms; or
all radar pulses have the same pulse duration and the waveform of an emitted radar pulse corresponds to the waveform of the previously emitted radar pulse shifted cyclically within the pulse duration.

19. The non-transitory computer-readable medium according to claim 15, wherein the radar pulses are emitted in repeating sequences of successive radar pulses (RP), wherein waveforms $s_i(t)$ of the radar pulses within a sequence read as follows:

$$s_i(t) = \begin{cases} e^{j\pi \frac{B}{T}\left(t-t_i-T\left(\left|\frac{t+\frac{T}{2}-t_i}{T}\right|\right)\right)^2}, & -\frac{T}{2} \le t \le \frac{T}{2} \\ 0, & \text{otherwise} \end{cases}$$

wherein i indicates the successive radar pulses of the sequence and i=0, 2BT−1 holds, wherein B represents the bandwidth of the radar pulse and T represents the pulse duration;

$$t_i = \frac{i(i+1)}{2B} - T\left\lfloor \frac{i(i+1)+BT}{2BT} \right\rfloor$$

wherein holds.

20. The non-transitory computer-readable medium according to claim 15, wherein the signal suppression is such that at least one of:
- the second range position is determined for a respective radar pulse and the signal is at least partially suppressed in the first focused data essentially only at the second range position; or
- a threshold value is applied to the signals in the entire first focused data, so that all signals above the threshold value are cut off at the threshold value or so that the signals are set to zero only at the positions which exceed the threshold value.

* * * * *